United States Patent [19]

Hollingsworth

[11] 3,734,703

[45] May 22, 1973

[54] METHOD FOR FORMING A BLOWN BOTTLE HAVING A CHIME IN THE SHOULDER PORTION THEREOF

[75] Inventor: Elvin R. Hollingsworth, Winchester, Ind.

[73] Assignee: Overmyer Corporation, Winchester, Ind.

[22] Filed: Jan. 12, 1971

[21] Appl. No.: 105,872

[52] U.S. Cl. ............................65/68, 65/82, 65/261, 65/307
[51] Int. Cl. ...............................................C03f 9/14
[58] Field of Search.......................65/307, 261, 374, 65/68, 81

[56] References Cited

UNITED STATES PATENTS

| | | | |
|---|---|---|---|
| 832,212 | 10/1906 | Ripley | 65/261 |
| 641,048 | 1/1900 | Sievert | 65/261 X |
| 877,981 | 2/1908 | Beeson | 65/307 |
| 2,328,662 | 9/1943 | Meredith et al. | 65/307 |
| 3,397,047 | 8/1968 | Rowe | 65/261 X |
| 3,428,722 | 2/1969 | Chittenden et al. | 65/261 X |
| 947,632 | 1/1910 | Bolton | 65/307 |
| 2,133,767 | 10/1938 | Goodrich | 65/307 |

*Primary Examiner*—Frank W. Miga
*Attorney*—Brown, Murray, Flick & Peckham

[57] ABSTRACT

Method for forming a bottle having a chime or groove in its shoulder portion. This is achieved by providing at the tops of two mold halves movable mold parts forming an annular flange. The movable parts and the flange carried thereby are normally urged upwardly by coil springs but are forced downwardly against the force of the springs by a blowhead positioned over the mold halves when closed around a partially formed glob of glass (i.e., a parison). After the bottle is blown, the blowhead is removed, permitting the aforesaid movable mold halves to move upwardly under the force of the springs to permit the mold halves to open and release the blown bottle having a chime in its shoulder portion.

4 Claims, 9 Drawing Figures

Patented May 22, 1973
3,734,703
2 Sheets-Sheet 1
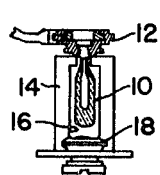
Fig. IA
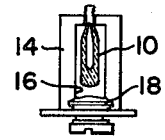
Fig. IB
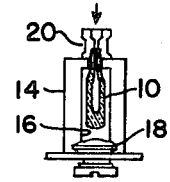
Fig. IC
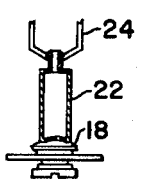
Fig. ID
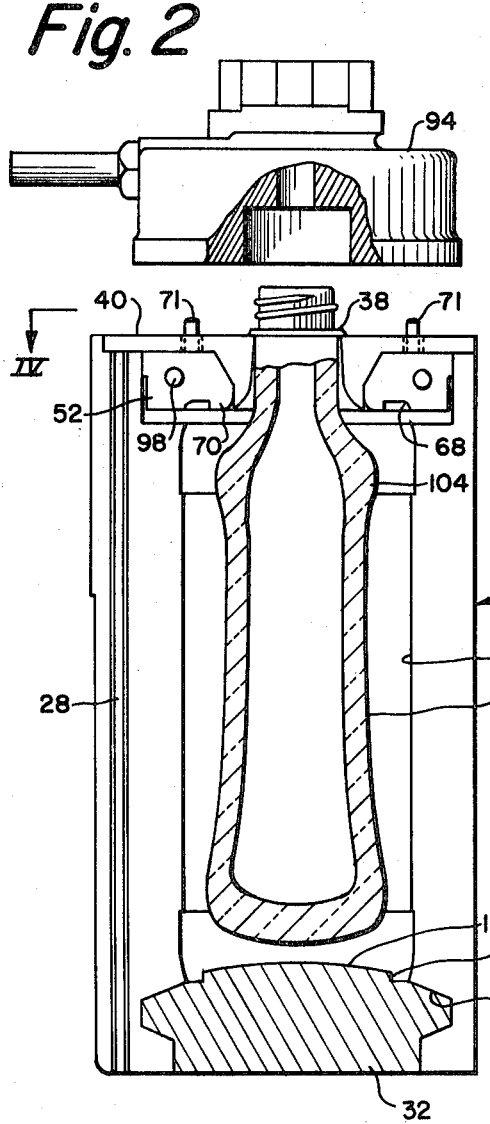
Fig. 2
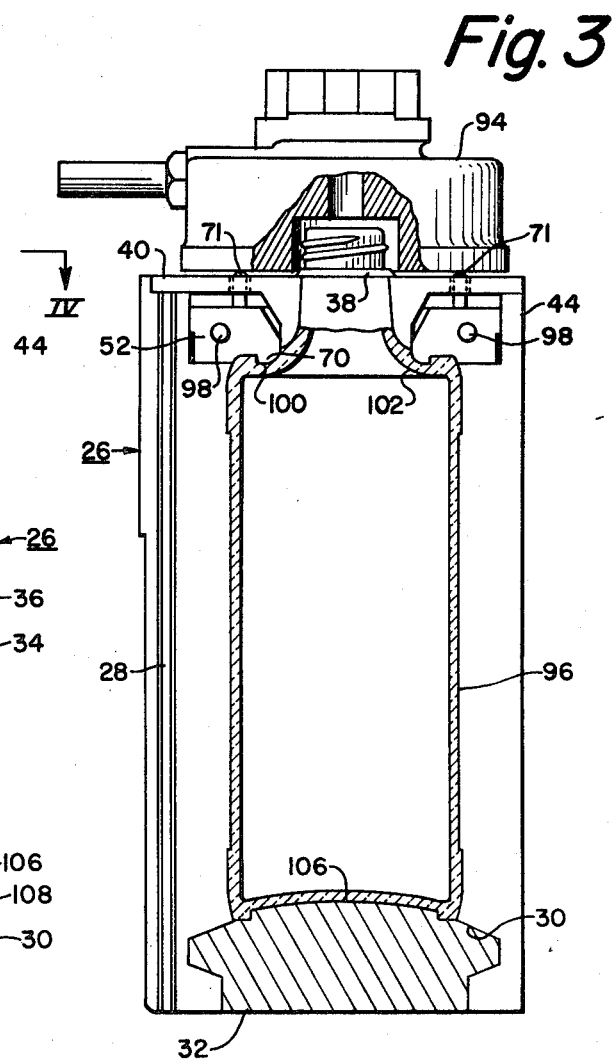
Fig. 3
INVENTOR
ELVIN R. HOLLINGSWORTH
BY Brown, Murray,
Flick & Peckham
ATTORNEYS Patented May 22, 1973
3,734,703
2 Sheets-Sheet 2
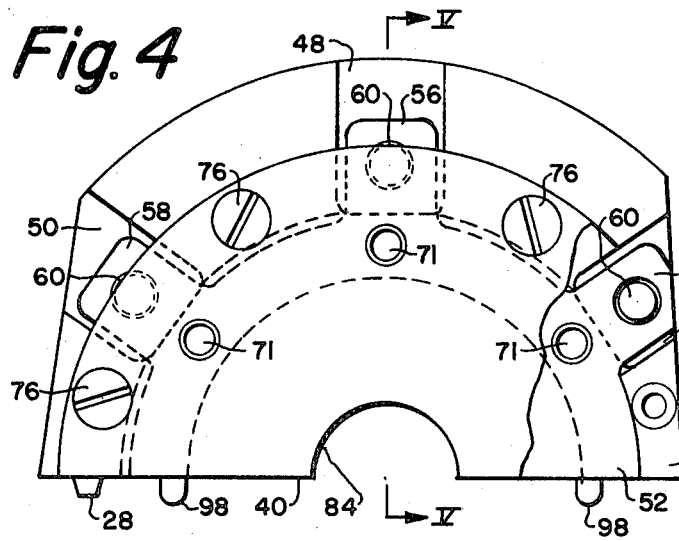
Fig. 4
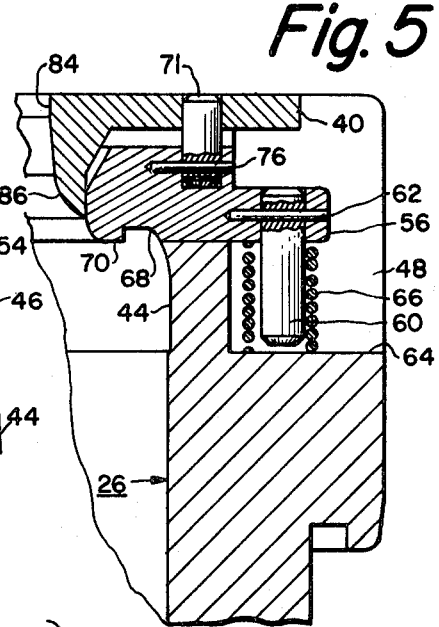
Fig. 5
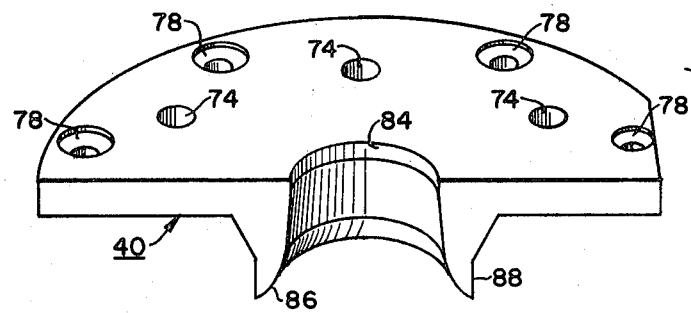
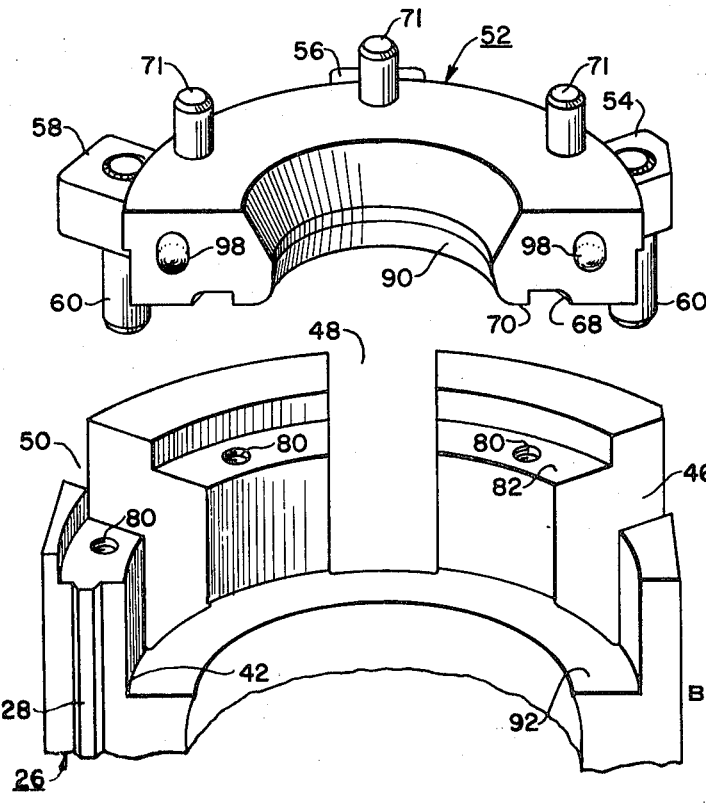
Fig. 6
INVENTOR
ELVIN R. HOLLINGSWORTH
BY
Brown, Murray
Flick & Peckham
ATTORNEYS 3,734,703

METHOD FOR FORMING A BLOWN BOTTLE HAVING A CHIME IN THE SHOULDER PORTION THEREOF

BACKGROUND OF THE INVENTION

As is known, canned or bottled beverages are usually sold in a so-called "six pack" which comprises a carrier for containers arranged in two rows of three containers each. One such recently developed carrier is shown and described in U.S. Pat. No. 3,395,509. This carrier, which has many advantages from the cost standpoint, clips onto the lips or chimes at the tops and bottoms of the cans. A carrier of this type, however, cannot be used on the usual beverage bottle since it does not have a top chime corresponding to that on a can. Furthermore, the provision of a groove or chime around the shoulder portion of a glass bottle is not feasible with conventional bottle molds. Such molds are formed from two semicircular parts which close about a vertical hinge axis to enclose a partially formed glob of glass and must thereafter open to release the formed bottle. If an attempt were made simply to provide a protrusion on the interior surface of the mold which projected downwardly to form the chime, it would be impossible to open the mold after the bottle had been blown.

SUMMARY OF THE INVENTION

In accordance with the present invention, a method is provided for forming a chime in the shoulder portion of a blown bottle by means of a movable mold part which is normally urged upwardly under spring pressure but which can be forced downwardly during a blowing operation to form a chime in the shoulder portion of a bottle. After the bottle is blown, the movable mold part is then released, whereupon it is forced upwardly under spring force to permit the mold halves to become separated.

Specifically, in accordance with the method of the invention, a partially formed glob of material is inserted into the space between separated, generally semicircular mold halves. Thereafter, the mold halves are closed in the usual manner to form a closed mold cavity around the glob of material. A movable mold part is then forced downwardly into the top of the mold cavity, which movable mold part is provided with a generally annular downwardly depending projection. By forcing air under pressure into the partially formed glob, a bottle is formed within the mold cavity and has a chime in its shoulder portion. Finally, the movable mold part is then moved upwardly such that the aforesaid projection clears the bottle formed within the mold cavity and the mold halves are separated to permit removal of the blown bottle from the space between the separated mold halves.

The above and other objects and features of the invention will become apparent from the following detailed description taken in connection with the accompanying drawings which form a part of this specification, and in which:

FIGS. 1A, 1B, 1C, and 1D are schematic views illustrating the conventional manner in which a glass bottle is blown;

FIG. 2 is an elevational view of one-half of the mold of the present invention showing a parison positioned within the mold and a blowhead over the mold and about to be fitted down over the mold;

FIG. 3 is an elevational view similar to that of FIG. 2 but showing the glass bottle in the mold after it has been blown, and also showing the blowhead positioned down over the mold such that it forces a movable mold part downwardly against spring pressure to form a chime in the blown bottle;

FIG. 4 is a top view of the mold half shown in FIG. 2 and taken substantially along line IV—IV of FIG. 2;

FIG. 5 is a cross-sectional view of the top of the mold half taken substantially along line V—V of FIG. 4; and FIG. 6 comprises an exploded view of the movable mold part at the top of the mold together with its associated cooperating elements.

With reference now to the drawings, and particularly to FIGS. 1A, 1B, 1C, and 1D, the steps involved in blowing a glass bottle from a parison are shown. The first step in the manufacture of any bottle is to form the parison 10 which is a partially formed glob of glass. The hot, molten glob of glass is initially dropped into an opening in a split parison mold, not shown, having two halves. At the bottom of the mold is a plunger which enters the neck portion of the glob of glass and forms a cavity therein. Thereafter, air under pressure is forced into the cavity to blow the parison. Thereafter, the parison mold halves are separated and the parison, carried on a neck ring 12 (FIG. 1A), is inserted into the interstice between two separated mold halves. Only one mold half is shown and identified by the reference numeral 14. At this stage of manufacture, the ring or bead at the top of the bottle and the threads are formed. After the parison 10 is disposed in the interstice between the two mold halves, the mold halves close and the bottle is released by the neck ring 12, whereupon the parison hangs down into the mold cavity 16, being supported by its neck ring at the top. At the bottom of the mold halves is a bottom plate 18 which forms the bottom of the bottle but is not connected to either one of the mold halves. Rather, the two mold halves close around the bottom plate to form the mold cavity 16.

After the two mold halves are closed as shown by FIG. 1B, the parison 10 is reheated. Thereafter, a blowhead 20 (FIG. 1C) is brought over the upper, open end of the parison and air under pressure is forced into the cavity formed in the parison, thereby forcing the molten glass outwardly to form the bottle with its outer periphery conforming to the inner periphery of the mold cavity 16. The bottom of the bottle is formed by the bottom plate 18. Thereafter, the mold halves are separated and the completed bottle 22 is lifted from the bottom plate 18 by means of tongs 24 or some other suitable instrumentality (FIG. 1D).

The mold of the present invention, which is used in the process outlined above, is shown in FIGS. 2–6. Only one mold half 26 is shown. This mold half is provided with a projection 28 (FIGS. 2–4) which fits into a cooperating slot in the other mold half when the mold halves are brought into engagement to form the mold cavity. At the bottom of each mold half 26 (FIGS. 2 and 3) is a grooved, semicircular opening 30 which receives a bottom plate 32. In FIG. 2, a parison 34 is shown positioned within the mold cavity 36 with its neck ring 38 resting on a top plate 40 which is perhaps best shown in FIG. 6. The top of the mold half 26 is formed with an enlarged diameter portion 42 defining a surrounding upstanding semicircular wall portion 44 (see also FIG. 5). Formed in the upstanding wall portion 44 are three slots 46, 48 and 50, the slot 48 being shown in FIG. 5. Received within the enlarged diameter portion 42 is a semicircular part 52 having three radially outwardly projecting lugs 54, 56 and 58 which slide within the slots 46, 48 and 50, respectively. Carried by the lugs 54–58 and depending downwardly therefrom are three pins 60 perhaps best shown in FIG. 5, which are held within the lugs 54–58 by means of pins 62. Surrounding each pin 60 and interposed between the bottom of lug 56, for example, and the bottom 64 of slot 48 are coil springs 66 which normally urge the semicircular part 52 upwardly. The lower surface of the part 52 which projects radially inwardly from the inner periphery of the mold 26 is provided with an annular slot 68 forming a downwardly-depending annular flange 70.

The part 52 is provided with pins 71 projecting upwardly from its upper surface. These pins extend through openings 74 in the top plate 40 and are secured to the part 52 by means of pins 76 (FIG. 5). The top plate 40, in turn, is secured to the top of the mold half 26 by means of screws 76 (FIG. 4) which extend through openings 78 (FIG. 6) in the top plate 40 and are threaded into openings 80 in an annular recess 82 formed in the top of the mold half 26 into which the plate 40 fits. The plate 40 is provided with a central circular opening 84 which fits around the neck of the bottle, as best shown in FIGS. 2 and 3. It is on the edge of the opening 84 that the neck ring 38 rests during a bottle-forming operation. Depending downwardly from the opening 84 is an annular, curved flange 86 having a surface 88 which mates with and slides on surface 90 of the part 52.

In FIG. 5, part 52 is shown depressed against the force of spring 66. In this position, the bottom surface of the part 52 rests on a ledge 92 formed by the enlarged diameter portion 42. The part 52 is forced into this position by means of a blowhead 94 (FIGS. 2 and 3) which is positioned over the mold halves and is forced downwardly against the upper surface of the plate 40. In this process, the blowhead 94 engages the tops of the pins 71, thereby forcing the part 52 downwardly against the force of springs 66. On the other hand, when the blowhead 94 is removed from the top of the mold halves, the springs 66 will force the part 52 and its downwardly-depending annular flange 70 upwardly.

In the process of forming a bottle in accordance with the teachings of the invention, the parison 34 (FIG. 2) is inserted into the interstice between the separated mold halves, one of which is shown in FIG. 2, for example. Thereafter, the mold halves are closed with the ring 38 of the bottle resting on the edge of opening 84 in plate 40. Thereafter, the blowhead 94 is lowered over the tops of the closed mold halves, in which process the tops of the pins 71 are contacted, thereby forcing the part 52 from the upper retracted position shown in FIG. 2 to the lowered position shown in FIG. 3. At this point, a blast of air under pressure is forced through the neck portion of the parison, thereby forming the bottle 96 shown in FIG. 3. Of course, the outer periphery of the bottle corresponds to the inner periphery of the mold cavity formed by the closed, mold halves. Note that as the mold halves close, pins 98 on part 52 fit into cooperating openings, not shown, on the other mold half.

As the bottle is being blown, the glass is forced outwardly and into the annular groove 68 in part 52, and because of the annular flange 70, a chime or groove 100 is formed in the shoulder portion 102 of the bottle 96. After the bottle is formed as shown in FIG. 3, it is impossible to open the mold halves with part 52 depressed since the flange 70 now extends into the formed chime 100 and will not permit the two mold halves to separate. However, before the mold halves separate, the blowhead 94 is raised, thereby permitting the springs 66 to force part 52 upwardly such that the lower edge of the flange 70 will clear the upper edge of the now-formed chime 100. At this point, the two mold halves can be separated and the bottle removed by tongs, such as tongs 24 shown in FIG. 1.

Referring again to FIG. 2, it will be noted that the parison 34 is peculiar in shape in that the upper portion of the parison has an expanded, thickened wall portion 104. This is in contrast to most parisons used where the bottle has a sloping shoulder. It is necessary to provide enough glass such that the parison, during the blowing operation, has enough glass in its upper portion to expand outwardly and around the then-depressed part 52. It will be noted also that the bottom plate 32 is provided with a central circular portion 106 having a sharp edge 108 which, in turn, forms a chime around the bottom of the bottle. Of course, the formation of a chime in the bottom of the bottle is not difficult since the mold halves separate on either side of the bottom plate at the completion of a blowing operation such that the completed bottle is lifted upwardly off the bottom plate.

Although the invention has been shown in connection with a certain specific embodiment, it will be readily apparent to those skilled in the art that various changes in form and method steps can be made to suit requirements without departing from the spirit and scope of the invention.

I claim:

1. In the method of forming a bottle having a shoulder portion characterized by including a generally annular chime defining a generally vertical surface suitable for engagement by a carrier for the bottle, the steps including:
    positioning a parison in the interstices between a pair of separated mold halves,
    enclosing said parison in a mold cavity formed by closing said mold halves,
    modifying said mold cavity by passing a flange member downwardly into the mold cavity to form a generally annular chime in the shoulder portion of a bottle during molding thereof,
    expanding by air pressure the cavity of the parison to form a bottle having an outer periphery defined by the modified mold cavity, which includes a formation of a chime in the shoulder portion of the bottle,
    separating said chime-forming member vertically from the chine formed in the shoulder of the bottle,
    separating said mold halves, and
    removing the formed bottle at the interstice between the separated mold halves.

2. The method according to claim 1 including the step of forming a parison from molten material, said parison characterized by an enlarged, thickened wall portion at the upper end of the parison and below the neck portion thereof to provide a sufficient volume of molten material to ultimately form an annular chime in the shoulder portion of a bottle during molding.

3. The method of claim 1 including the steps of:
positioning a blowhead above the upper open end of said parison after closing said mold halves,
moving said blowhead into engagement with the top of said mold halves while concurrently displacing said flange member downwardly into the mold cavity for said modifying said mold cavity.

4. The method of claim 1 comprising the additional step of urging said flange member upwardly under a continuous spring pressure.

* * * * *